United States Patent [19]

Cull

[11] 4,176,089

[45] Nov. 27, 1979

[54] PROCESS FOR THE PREPARATION OF SILICA-TITANIA AND CATALYSTS COMPRISING THE SAME

[75] Inventor: Neville L. Cull, Baker, La.

[73] Assignee: Exxon Research & Engineering Co., Florham Park, N.J.

[21] Appl. No.: 930,573

[22] Filed: Aug. 3, 1978

[51] Int. Cl.$^2$ .................... B01J 37/02; B01J 29/00
[52] U.S. Cl. .................... 252/452; 252/454
[58] Field of Search .................... 252/452, 453, 454

[56] References Cited

U.S. PATENT DOCUMENTS

| | | | |
|---|---|---|---|
| 2,378,290 | 6/1945 | Drake | 252/317 |
| 2,873,246 | 2/1959 | Hansford et al. | 252/452 X |
| 3,639,461 | 2/1972 | Ito et al. | 252/454 X |
| 3,709,833 | 1/1973 | Thomas | 252/452 X |
| 3,954,670 | 5/1976 | Pine | 252/432 |
| 3,983,055 | 9/1976 | Mitchell et al. | 252/454 |
| 3,993,557 | 11/1976 | Pine | 208/111 |

*Primary Examiner*—Carl Dees
*Attorney, Agent, or Firm*—Marthe L. Gibbons

[57] ABSTRACT

High surface area, low bulk density silica-titania materials which are particularly effective as catalysts or catalyst supports are prepared by mixing a silicon alkoxide, a titanium alkoxide and an organic diluent, adding the resulting premixed alkoxides to a hydrolysis medium comprising water and a solvent to form a silica-titania precipitate, separating the silica-titania precipitate from the hydrolysis medium, drying and calcining the precipitate and recovering the resulting high surface area silica-titania product.

37 Claims, 1 Drawing Figure

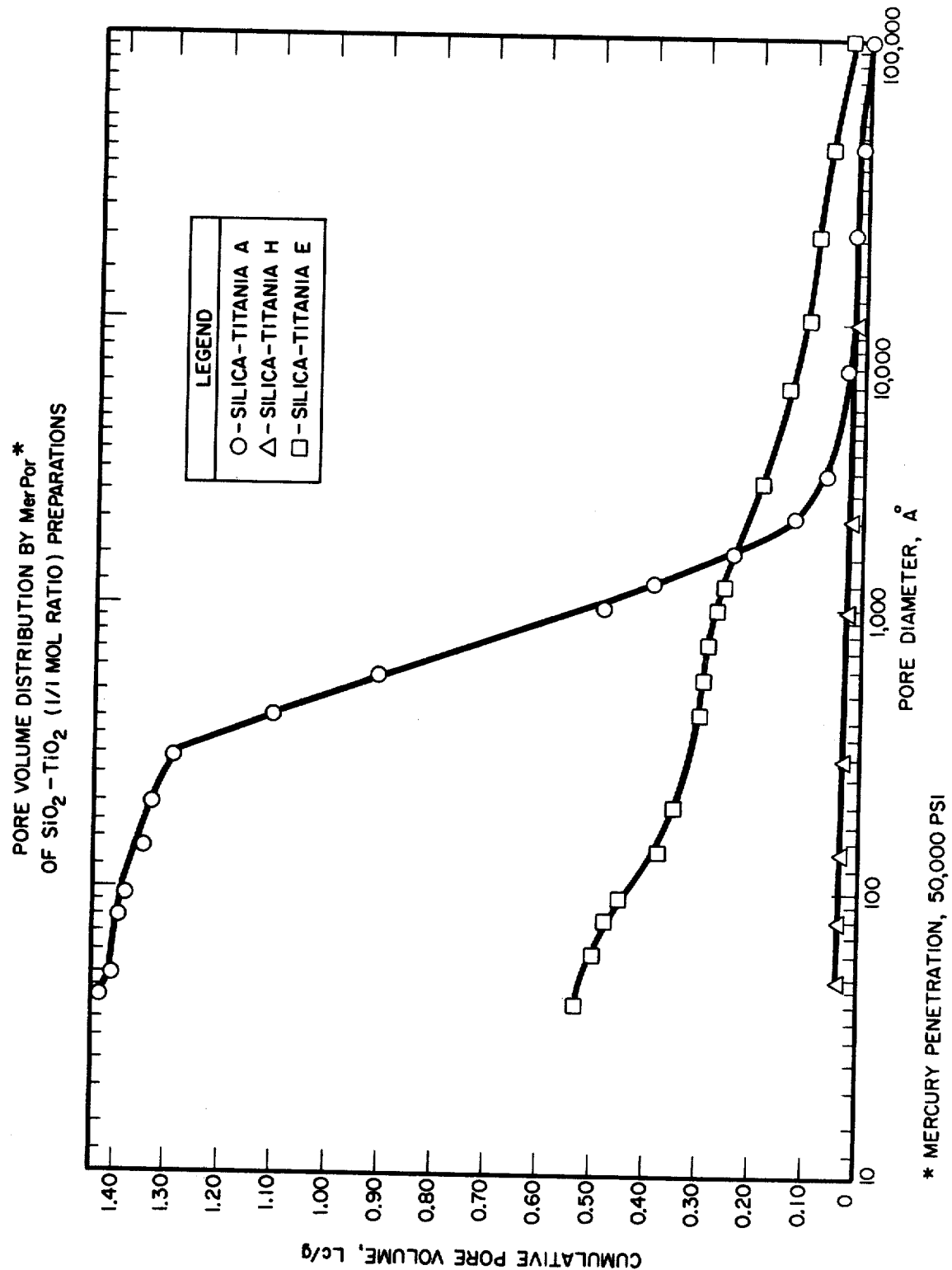

4,176,089

PROCESS FOR THE PREPARATION OF SILICA-TITANIA AND CATALYSTS COMPRISING THE SAME

BACKGROUND OF THE INVENTION

1. Field of the Invention

The present invention relates to the preparation of mixed oxides of silicon and titanium useful as catalyst support and catalysts comprising the silica-titania support.

2. Description of the Prior Art

Catalysts and sorbents utilizing a metal oxide or a mixed metal oxide support are well known. It is also known to prepare mixed oxides of silicon and titanium by various methods such as those shown by Tanabe, *Journal of Catalysis*, 35, 225–231 (1974).

U.S. Pat. No. 3,983,055 discloses, in Example 24, the preparation of a mixed titanium-silicon catalyst by using a halo-silicon or halo-titanium compounds as starting materials.

U.S. Pat. No. 2,378,290 discloses the preparation of silicon oxide-titanium oxide catalyst support using $TiCl_4$ and $Na_2SiO_3$ as starting materials. The titanium chloride is introduced in vapor phase.

U.S. Pat. No. 3,954,670 and U.S. Pat. No. 3,993,557 disclose catalyst supports comprising boria and alumina prepared by the hydrolysis of a mixture of boron alkoxide and aluminum alkoxide.

Typically, the silica-titania materials are prepared by using a mixture of titanium tetrachloride with a silicon ester, precipitating the silica-titania by treatment with ammonia or urea followed by extensive washing of the precipitate. The disadvantage of the prior art method is the difficulty of washing the precipitated oxides free of contaminating anions and cations. This problem can be avoided by using silicon alkoxides and titanium alkoxides to form high purity mixed oxides. However, silicon esters (alkoxides) hydrolyze at a much slower rate than do titanium esters (alkoxides). The rate of hydrolysis of the silicon esters can be catalyzed by acids or bases. Because of the differences in hydrolysis rates of the silicon and titanium alkoxides, these materials have not been used extensively as precursors for the preparation of mixed oxides of silicon and titanium, although the combination of titanium tetrachloride with silicon alkoxides has been used.

It has now been found that high purity, high surface area, low bulk density mixed silica-titania materials can be prepared by premixing the alkoxides of titanium and silicon and adding the premixed alkoxides to the hydrolysis medium.

SUMMARY OF THE INVENTION

In accordance with the invention there is provided, a process for the preparation of a silica-titania composition which comprises the steps of: (a) mixing a silicon alkoxide, a titanium alkoxide and an organic diluent; (b) adding the resulting mixed alkoxides mixture to a hydrolysis mixture comprising water and an organic solvent to hydrolyze said mixed alkoxides and form a silica-titania precipitate.

Furthermore, in accordance with another embodiment of the invention, the silica-titania products of the invention can be used as support and composited with conventional sorption active or catalytic materials to form sorbents and catalysts.

BRIEF DESCRIPTION OF THE DRAWING

The FIGURE is a graph showing comparative pore volume distribution for silica-titania products.

DETAILED DESCRIPTION OF THE INVENTION

To prepare the silica-titania composition, i.e., mixed oxides of silicon and titanium of the present invention, a silicon alkoxide and a titanium alkoxide are mixed with an organic diluent. The alkoxide constituent of the titanium alkoxide and of the silicon alkoxide may be any alkoxide constituent which contains from 1 to 20, preferably from 2 to 4 carbon atoms and which is soluble in the liquid reaction medium. Suitable alkoxides include n-butoxide, secondary butoxide, isobutoxide, isopropoxide, n-propoxide, ethoxide and methoxide. The methyl or ethyl esters (alkoxides) of silicon and the isopropyl or butyl esters (alkoxides) of titanium are preferred. The organic diluent which is mixed with the titanium alkoxide and the silicon alkoxide may be an aromatic compound like benzene, toluene and xylene; a paraffin such as hexane, heptane, and cyclohexane; a halogenated hydrocarbon such as tetrachloroethylene; ethers such as diethylether; ketones such as methyl ethyl ketone, acetone, etc. Preferably, organic solvents which exhibit mutual solubility for the titanium and silicon alkoxides and for water are used as the diluent. More preferably, the diluent is an alcohol, most preferably a $C_1$ to $C_4$ alcohol such as methanol, ethanol, normal and isopropanol, normal and isobutanol. It is believed that the beneficial effect of using alcohols arises from (1) the alcohol solvating the titanium alkoxide and retarding its rate of hydrolysis, (2) the formation of titanium alkoxy acids which serve to catalyze the hydrolysis of the silicon alkoxides or a combination of these effects. The molar ratio of silicon alkoxide to titanium alkoxide that are mixed together will depend upon the desired ratio of titanium oxide and silicon oxide in the final composition. Thus, the molar ratio of silicon alkoxide to titanium dioxide may range from about 10:1 to about 0.05:1. Since the 1:1 $SiO_2$ to $TiO_2$ mixed oxide has a relatively high surface area and acidity, it is preferred to use a molar ratio of 1:1 silicon alkoxide to titanium alkoxide. The organic diluent mixed with the alkoxides is added in an amount ranging from about 10 to 100 volume percent based on the total mixture. The mixture is prepared at ambient temperature and atmospheric pressure. The resulting mixture comprising the two alkoxides and the organic diluent is added to the hydrolysis mixture or medium. In accordance with the present invention, the order of addition must be the addition of the premixed alkoxides to the hydrolysis mixture to produce the desired physical characteristics in the final silica-titania product, in contrast to the usual procedure of adding the hydrolysis mixture to the mixed alkoxides. Furthermore, if the hydrolysis mixture and the titanium alkoxides are added separately to the silicon alkoxide, low pore volume materials are obtained. The hydrolysis mixture comprises water and an organic solvent. Water is generally present in an amount sufficient to hydrolyze theoretically completely the silicon alkoxide and the titanium alkoxide. A 5 to 10 molar excess of water may be utilized to insure complete hydrolysis of the alkoxides. The organic solvent in the hydrolysis mixture is generally an organic liquid which acts as solvent for the system. Preferred solvents include $C_1$ to $C_4$ alcohols such as methanol, ethanol, ethanol, propanols, butanols, etc. The amount of solvent used may suitably range up to about 200, preferably from about 50 to about 100 volume parts per hundred volume parts of mixed alkoxides. Thus, the organic solvent may suitably be present in the hydrolysis mixture in an amount ranging from about 50 to about 95 volume percent based on the total hydrolysis mixture. Optionally, a minor amount of a conventional hydrolysis catalyst, such as mineral acids, for example, nitric acid, phosphoric acid, etc. or bases, such as sodium hydroxide, potassium hydroxide, $(CH_3)_4NOH$, may be present in the hydrolysis mixture. Since the acids or bases may provide contaminating anions or cations, it may be preferable to omit them from the hydrolysis mixture except for nitric acid or quarternary ammonium hydroxides which would be decomposed upon calcination.

The hydrolysis reaction is conducted at a temperature ranging from about 25° to about 100° C., preferably at a temperature from about 54° to about 60° C. and at atmospheric pressure. If desired, superatmospheric pressures may be used but are not believed to be advantageous. The addition is carried out slowly, that is, at a rate ranging from about 2 cc per minute to about 6 cc per minute. The addition is generally conducted over a period of about 3 to 4 hours with stirring. After all of the mixture of alkoxides has been added to the hydrolysis mixture, stirring is continued for an additional hour. The slurry is allowed to cool and is filtered to recover the formed precipitate. The precipitate is then air dried at a temperature ranging from about 25° C. to about 100° C. and calcined at a temperature ranging from about 400° to about 800° C., preferably from about 500° to about 600° C. at atmospheric pressure for a period of about 4 to about 24 hours. The final product is a mixed oxide of silicon and titanium (i.e., silica-titania) having a relatively high surface area, high pore volume and low bulk density and is remarkably pure, that is, free of extraneous anions and cation impurities. The physical characteristics of the silica-titania products obtainable in accordance with the present invention are given in Table I. By B.E.T. is intended herein a nitrogen adsorption method of Braunauer, Emmett and Teller as shown in "Adsorption of Gases in Multi-Molecular Layers," *J. Am. Chem. Soc.*, Vol. 60 (1938), pp. 309-319. By MERPOR is intended herein a mercury penetration method using porosimeter model 915-2 manufactured by Micrometritics Corp., Norcross, Ga. The surface tension of the mercury was taken at a contact angle of 140 degrees. A pressure of 50,000 psig was used unless otherwise specified.

TABLE I

| PHYSICAL PROPERTIES OF SILICA MIXED OXIDES[1] | | | |
|---|---|---|---|
| Mole Ratio $SiO_2/TiO_2$ | 1/1 | 0.1/1 | 1/0.1 |
| Wt. % $TiO_2$[2] | 57 | 93 | 11.3 |
| Wt. % $TiO_2$[3] | 53–63 | 91 | 24 |
| Physical Properties | | | |
| BET Surface Area, $m^2/g$ | 200–400 | 100–200 | 100–200 |
| Pore Volume, cc/g (BET) | 0.4–1.4 | 0.3–0.6 | 0.4–1.0 |
| MERPOR pore volume, cc/g | 1.0–2.4 | 0.6–1.5 | 1.0–2.6 |
| Tapped Bulk Density, g/cc | 0.30–0.60 | 0.4–0.70 | 0.2–0.50 |

[1]All physical properties were obtained on products calcined 16 hours at 532° C.
[2]Calculated.
[3]Analytical method.

If desired, the silica-titania products may be combined with catalytic materials either prior or subsequent to calcination.

The silica-titania composition of the present invention may be used as carrier or support for catalytic materials which function as catalysts for the removal of nitrogen oxides from gaseous mixture or for sorption active materials which function as sorbents. In general, these metals or compounds of such metals are known to include Group IB, Group VB, Group VIB, Group VIIB and Group VIII of the Periodic Table of Elements. The Periodic Table referred to herein is in accordance with Webster's Seventh Collegiate Dictionary, 1963, published by G & C Merriam Co.

The mixed metal oxides of the present invention are acidic and may also be used advantageously as catalyst, or as component of a catalyst as well as catalyst support for catalytic materials generally used for hydrocarbon treating and conversion processes, especially for acid catalyzed reactions such as isomerization, alkylation, catalytic cracking, hydrocracking, polymerization, etc. In general, these metals or compounds of such metals are known to include Group IB, Group IIA, Group IIB, Group IIIB, Group IVA, Group VB, Group VIB, Group VIIB, Group VIII and the rare earth metal lanthanides series.

The catalytically active metals or metal compounds may be combined with the support of the present invention in any conventional way known in the art such as deposition, impregnation and at any suitable stage of the preparation of the mixed oxides, including before or after calcination of the mixed silica-titania oxides.

For use in the removal of nitrogen oxides from gaseous mixtures, the silica-titania products of the present invention may be used as support for catalytically active metals or metal compounds known to be catalysts for the removal of nitrogen oxide from gaseous mixture. For example, suitable catalytically active materials include metals or metal compounds of copper, iron, chromium, vanadium and Group VIII noble metals.

Suitable gaseous mixtures from which nitrogen oxides can be removed include exhaust gases from internal combustion engines either stationary or mobile, tail gases from nitric acid plants or chemical nitration operations, exhaust gases from combustion of fossil fuels and power plants, boilers. The catalyst and catalyst support of the present invention are particularly well suited for the removal of nitrogen oxide from stationary combustion sources wherein the flue gas is a net oxidizing composition comprising sulfur oxides and wherein ammonia is used as the selective reducing agent for the removal of nitrogen oxide. The nitrogen oxide removal is typically conducted in a process in which the catalyst is disposed in a fixed bed wherein the catalyst is in the form of extrudates or rings or other low pressure drop shapes. Gas space velocities generally range from about 3000 to about 40,000 V/Hr/V or even higher. If desired, the catalyst support may be coated on ceramic monoliths prior to impregnation with a catalytic active component. The ammonia to nitrogen oxide mole ratio used generally ranges from about 0.67 to 1 to about 2.0 to 1, preferably from about 1 to 1.

Generally, removal of nitrogen oxide catalytic processes are conducted at temperatures ranging from about 300° C. to about 425° C. and at a pressure ranging from about 0 to about 10 psig in the presence of ammonia, under net oxidizing conditions.

PREFERRED EMBODIMENTS

Example 1

Mixed oxides of silicon and titanium were prepared by prior art method and by the method of the present invention. The silica-titania prepared by the method of the present invention are designated silica-titania preparations A, B, C and D. The prior art preparations are designated E, F, G and H. The physical characteristics of the silica-titania materials are shown in Table II. As can be seen from the data in Table II, the silica-titania of the present invention, that is, preparations A, B, C and D, had higher surface areas, lower bulk densities and higher macroporosities than the prior art comparative materials. The FIGURE contains the pore volume distribution of silica-titania preparation E made from $TiCl_4$-$Si(OMe)_4$ according to the procedure of Tanabe, as well as a silica-titania preparation A prepared in accordance with the present invention. The silica-titania mixed oxides of Table II were prepared as follows:

Silica-Titania F

To a five liter three-neck flask equipped with a stirrer, dropping funnel, thermowell and reflux condenser were charged 284 grams (1 mole) of titanium tetrapropoxide and 152 grams (1 mole) of tetramethyl silicate. The alkoxide mixture was diluted with 1000 cc of isopropanol and heated to 75°-80° C. with stirring. Water (144 grams) was dissolved in isopropanol to make 1000 cc of hydrolysis solution. The water-isopropanol solution was added to the alcohol-alkoxide mixture at the rate of approximately 3 to 4 cc per minute while maintaining the temperature at 70° to 80° C. Total addition time was approximately 5 hours.

After cooling, the product was filtered and dried on a steam bath for approximately 8 hours. The dried product was subsequently calcined by bringing the temperature up slowly, for 16 hours at 540° C. The recovered product weighed 129 grams (theoretical weight would be 140 grams). The recovered product is designated preparation F in Table II.

Silica-Titania Preparation G

A mixed oxide of silica and titania was prepared as described in preparation F except that 6 cc of 85% phosphoric acid were added to the hydrolysis mixture (144 grams $H_2O$, 6 cc $H_3PO_4$ and 850 cc isopropanol). After calcination for 16 hours at 540° C., 140.5 grams of product were recovered (theoretical for silica-titania would be 140 grams). The physical properties of the calcined products are given in Table II under preparation F. Note that by adding the phosphoric acid as a hydrolysis catalyst, the surface area was improved, but the pore volume and especially the macroporosity were low.

Silica-Titania Preparation H

To a 5 liter round bottom flask equipped with a stirrer, 2 dropping funnels, a thermowell and a reflux condenser were charged 76 grams (0.5 moles) of tetramethylsilicate plus 1000 cc of isopropanol. The contents of the flask were heated with stirring to approximately 60°-70° C. Seventy-two cc of water plus 428 cc of isopropanol (hydrolysis medium) were added at a rate of approximately 4 cc per minute using one of the dropping funnels. A solution of 142 grams (0.5 moles) of tetraisopropyl titanate diluted to a volume of 250 cc with isopropanol were added concurrently with the addition of the hydrolysis medium at the rate of about 2 cc per minute. The temperature of the flask was maintained during the addition at 60°-65° C. The approximate time required for the addition was about 2.5 hours.

After all reagents had been added, the reaction mixture was stirred for an additional hour at 60° C. prior to cooling down. Workup of the product was the same as given in preparation F. The product recovered weighed 68.3 grams (theoretical 70.0 grams). Physical properties of the calcined products are shown in Table II under preparation H. Note that the bulk density is high and the pore volume low, although the surface area is reasonably high.

Silica-Titania Preparation A

Seventy-two cc of water plus 928 cc of isopropanol were charged to a 5 liter round bottom flask equipped with stirrer, dropping funnel, thermowell and reflux condenser. The hydrolysis mixture was heated to 60°-65° C. with stirring. To the hydrolysis mixture was added a mixture of 76 grams (0.5 moles) of tetramethylsilicate and 142 grams (0.5 moles) of tetraisopropyl titanate diluted to 500 cc total volume with isopropanol. The addition rate of the alkoxide-alcohol solution was approximately 3 cc per minute. After all the reactants had been added (approximately 3 hours), the suspension was stirred and maintained on temperature for an additional hour. The product was worked up as in preparation F. The yield of product was 63.5 grams (theoretical would be 70 grams). Physical property data are given in Table II under preparation silica-titania A. The silica-titania A was prepared in accordance with the present invention. Note the low bulk density, high macroporosity and increase in pore volume. Also note that the order of addition was the alcohol-alkoxide mixture was added to the hydrolysis medium. This is the so-called reverse addition procedure.

Silica-Titania Preparation B

A mixed silica-titania oxide was prepared as in preparation A except that 3 cc of 85% concentrated phosphoric acid was added to the hydrolysis medium (72 cc $H_2O$; 3 cc $H_3PO_4$ and 925 cc of isopropanol). The product was worked up as in the previous description of the preparation with a yield of calcined product of 65.2 grams (theoretical would be 70 grams). Data on physical property of the calcined product are given in Table II under preparation silica-titania B. The silica-titania B was prepared in accordance with the present invention.

Silica-Titania Preparation C

A silica-titania mixed oxide was prepared as shown for preparation A except that 12 cc of the 25 percent solution of tetramethylammonium hydroxide in methanol was added to the hydrolysis medium (72 cc water, 12 cc of 25% $(CH_3)_4NOH$ and 916 cc of isopropanol). The yield of calcined product was 64.03 grams (theoretical, 70 grams) after workup as in preparation F. Physical property data for the calcined product are shown in Table II under preparation silica-titania C.

Silica-Titania Preparation D

A silica-titania mixed oxide was prepared as described in preparation A except that the tetraethyl silicate was substituted for the tetramethyl silicate. Physical properties of the calcined product after workup as in the preceding preparations are given in Tables I and III under preparation silica-titania D. The product yield was 89 percent of theoretical and analyzed 47% silica and 53% titania (theoretical=43% $SiO_2$, 57% $TiO_2$). Substitution of the tetraethyl silicate for the tetramethyl silicate had no discernible effect on the physical properties of the product obtained. The silica-titania D is a product in accordance with the present invention.

Silica-Titania Preparation E

A silica-titania mixed oxide was prepared according to the procedure of Tanabe, *Journal of Catalysis* 35, 225-231 (1974) by mixing 48 grams of $TiCl_4$ (0.25 moles) with 52.6 grams (0.25 moles) of tetraethyl silicate in a flask. The temperature rose to about 60° C. and a yellow brown precipitate formed. To the $TiCl_4$-$Si(OEt)_4$ mixture was added very slowly in approximately 2 hours, 160 cc of 28% ammonium hydroxide. The precipitate changed from yellow to white in color. It was then heated on a water bath at 95° C. for approximately 1 hour. An additional 200 cc of 28% ammonium hydroxide were added and the resulting mixture was reheated on a water bath at 95° C. The product was filtered and washed exhaustively using deionized water. After repeated filtering and washing over a three day period, the product was air dried and then calcined for 16 hours at 540° C. The product on analysis showed 841 ppm of chloride present. Physical property of the calcined product are given in Table II under preparation silica-titania E. Note the higher bulk density, lower pore volume obtained. This product was not prepared in accordance with the invention.

Example 2

A silica-titania mixed oxide was prepared as shown in preparation D with the exception that the mole ratio of $Si(OEt)_4/Ti(OiPr)_4$ was changed from 1/1 to 1/0.1. The calcined product, although lower in surface area showed high pore volume, low bulk density and high macroporosity. Physical property data are shown in Table III under preparation J. This product was prepared in accordance with the present invention.

Example 3

A silica-titania mixed oxide was prepared as in preparation D with the exception that the mole ratio of $Si(OEt)_4/Ti(OiPr)_4$ was changed from 1/1 to 0.1/1. The calcined product showed the presence of anatase by X-ray diffraction. Physical property data are given in Table III under preparation K. This product was prepared in accordance with the present invention.

Example 4

A silica-titania mixed oxide was prepared as in preparation D with the exception that $Si(OEt)_4$ and $Ti(OPr)_4$ mixture was dissolved in p-dioxane as diluent and the hydrolysis medium consisted of water in p-dioxane. Physical property and analytic inspection on the calcined product along with product from a control run prepared exactly as in preparation D are shown in Table IV. The data of Table IV will indicate that isopropanol gives a product in which the $TiO_2/SiO_2$ ratio is closer to that expected by the amounts of alkoxides used in the preparation. The use of isopropanol would thus be the preferred solvent, although the physical properties obtained using dioxane were comparable to those obtained with isopropanol. The silica-titania of Table IV, that is, silica-titania L and silica-titania M are mixed oxides in accordance with the present invention.

Example 5

A 1/1 silica-titania prepared by hydrolysisl of a 1/1 molar mixture of tetramethylsilicate and tetrapropyl titanate in the form of 10/20 mesh particles was impregnated with an aqueous solution of copper nitrate to give 4 weight percent copper on the support. The impregnated catalyst was air dried for approximately 40 hours and then calcined for 3 hours at 425° C. A portion of the catalyst was tested for removal of nitrogen oxides from a gaseous mixture. The results of these tests are shown in Table V. The feed gas composition used comprised 9.2 volume percent $CO_2$; 5.2 volume percent $O_2$; 225 ppm NO; 400 ppm $SO_2$; 10.3 volume percent $H_2O$ and the balance nitrogen. The $NH_3/NO_x$ ratio was 1.02/1 V/Hr/V 19,570.

TABLE II

| | SILICA-TITANIA (1/1) MIXED OXIDES - PREPARATIVE AND INSPECTION DATA | | | | | | | |
|---|---|---|---|---|---|---|---|---|
| Preparation No. | F | G | H | A | B | C | D | E |
| Addition Procedure | Hydrolysis Mixture Added to Mixed Alkoxides | Hydrolysis mix and Ti(OR)$_4$ added separately to (CH$_3$O)$_4$Si | | Mixed alkoxides added to the Hydrolysis Mixture (so called "reverse addition") | | | | Tanabe$^{(1)}$ |
| Hydrolysis Catalyst | None | H$_3$PO$_4$ | None | None | H$_3$PO$_4$ | (CH$_3$)$_4$NOH | None | — |
| Product Calc. 16 hrs. @ 540° C. | | | | | | | | |
| Surface Area, m²/g (BET) | 77 | 299 | 271 | 319 | 272 | 212 | 386 | 160 |
| Pore Volume, cc/g (BET) | 0.08 | 0.23 | 0.17 | 0.89 | 1.03 | 0.76 | 0.70 | 0.34 |
| Pore Volume, cc/g by Mercury Penetration (50,000 psi) | — | — | 0.03 | 1.43 | 1.42 | 1.12 | 1.74 | 0.53 |
| Bulk Density, g/cc | 1.11 | — | 0.99 | 0.374 | 0.398 | 0.44 | 0.35 | 0.81 |
| Acidity, *Ho | — | ≥ −8.2 | ≥ −8.2 | ≥ −8.2 | ≥ −8.2 | ≥ −8.2 | ≥ −8.2 | |
| X-Ray | | | | ------ Increasingly amorphous ------ | | | | |
| Chloride, ppm | — | — | — | — | — | — | — | 840 |

*By Hammet Indicators
$^{(1)}$Prepared by Tanabe procedure in J. Catalysis. Product contained 840 ppm of chloride.

TABLE III

| SILICA-TITANIA MIXED OXIDES PREPARATION AND INSPECTION DATA | | | |
|---|---|---|---|
| Preparation | I | J | K |
| Addition Procedure | Mixed alkoxides added to hydrolysis mixture | | |
| Hydrolysis Catalyst | None | None | None |
| $Si(OEt)_4/Ti(OiPr)_4$ | 1/1 | 1/0.1 | 0.1/1 |

TABLE III-continued
SILICA-TITANIA MIXED OXIDES PREPARATION AND INSPECTION DATA

| Molar Ratio Product, Calcined 16 Hrs. at 540° C. | | | |
|---|---|---|---|
| BET Surface Area, m$^2$/g | 386 | 105 | 132 |
| Pore Volume, cc/g (BET) | 0.70 | 0.70 | 0.34 |
| MERPOR, Pore Volume, cc/g | 1.74 | 0.56 | 0.96 |
| Bulk Density, g/cc | 0.35 | 0.21 | 0.55 |
| X-Ray | Amorphous | Amorphous | Some anatase |
| Wt. % TiO$_2$ (theoretical) | 57 | 12 | 93 |
| Wt. % TiO$_2$ (analyzed) | 53 | 24 | 91 |

Table IV
SILICA-TITANIA (1/1) MIXED OXIDES (EFFECT OF SOLVENT)

| Preparation | L | M |
|---|---|---|
| Solvent | p-dioxane | isopropanol |
| Hydrolysis Catalyst | None | None |
| Product Calcined 16 hrs. at 540° C. | | |
| BET Surface Area, m$^2$/g | 352 | 353 |
| Pore Volume, cc/g (BET) | 1.39 | 1.43 |
| MERPOR, Pore Volume, cc/g | 2.39 | 1.81 |
| Bulk Density, g/cc | 0.30 | 0.38 |
| Yield$^{(1)}$, wt. % | 84 | 93 |
| Wt. % TiO$_2$ (calc.) | 57 | 57 |
| Wt. % TiO$_2$ (anal.) | 62 | 58 |

$^{(1)}$Yield calculated as $\frac{\text{wt. of calcined product recovered} \times 100}{\text{theoretical wt. of SiO}_2\text{—TiO}_2}$

TABLE V
DeNO$_x$ ACTIVITY OF SiO$_2$/TiO$_2$ SUPPORTED CATALYST

| Support | SiO$_2$/TiO$_2$ (1/1) |
|---|---|
| Wt. % Cu on Support | 4 |
| % NO$_x$ Removed at °F. | |
| 620 | 83 |
| 680 | 94 |
| 730 | 96 |
| 800 | 97 |

What is claimed is:

1. A process for the preparation of a silica-titania composition which comprises the steps of:
   (a) mixing a silicon alkoxide, titanium alkoxide and an organic diluent, and
   (b) adding the resulting mixed alkoxides mixture to a hydrolysis mixture comprising water and an organic solvent to hydrolyze said mixed alkoxides and form a silica-titania precipitate.

2. The process of claim 1 wherein said silica-titania composition has a surface area ranging from about 100 to about 400 m$^2$/g and a bulk density ranging from about 0.2 to about 0.60 g/cc.

3. The process of claim 1 wherein said silica-titania composition has a surface area ranging from about 200 to about 400 m$^2$/g and a bulk density ranging from about 0.3 to about 0.6 g/cc.

4. The process of claim 1 wherein said silica-titania composition comprises from about 53 to about 91 weight percent titania.

5. The process of claim 1 wherein said organic diluent comprises an alcohol.

6. The process of claim 1 wherein said organic solvent in said hydrolysis mixture is an alcohol.

7. The process of claim 1 wherein the molar ratio of silicon alkoxide to titanium alkoxide in step (a) ranges from about 0.05:1 to 10:1.

8. The process of claim 1 wherein the molar ratio of silicon alkoxide to titanium alkoxide in step (a) is about 1:1.

9. The process of claim 1 wherein the hydrolysis of step (b) is conducted at a temperature ranging from about 25 to about 100° C.

10. The process of claim 1 wherein said mixed alkoxides mixture is added to said hydrolysis mixture at a rate of about 2 to about 6 cc/minute.

11. The process of claim 1 wherein said alkoxide constituent of said silicon alkoxide and of said titanium alkoxide is selected from the group consisting of C$_1$ to C$_{20}$ alkoxides.

12. The process of claim 1 wherein said alcohol diluent used in step (a) is selected from the groups consisting of C$_1$ to C$_4$ alcohols.

13. The process of claim 3 wherein said alcohol solvent used in said hydrolysis mixture is selected from the group consisting of C$_1$ to C$_4$ alcohols.

14. The process of claim 1 wherein said water is present in said hydrolysis mixture in an amount sufficient to hydrolyze theoretically completely said alkoxides.

15. The process of claim 1 wherein said organic solvent is present in said hydrolysis mixture in an amount ranging from about 50 to about 95 volume percent based on the total hydrolysis mixture.

16. The process of claim 1 wherein said silica-titania precipitate is separated from said hydrolysis mixture and wherein the separated precipitate is calcined.

17. The process of claim 16 wherein said calcination is conducted at a temperature ranging from about 400 to about 800° C.

18. The process of claim 16 wherein prior to said calcination step, said precipitate is air dried.

19. A process for the preparation of a catalyst which comprises compositing a metal or a compound of a metal selected from the group consisting of Groups IB, IIA, IIB, IVA, IVB, VIB, VIIB and VIII and mixtures thereof and a silica-titania composition prepared by steps which comprise:
   (a) mixing a silicon alkoxide, a titanium alkoxide and an organic diluent, and
   (b) adding the resulting mixed alkoxides mixture to a hydrolysis mixture comprising water and an organic solvent to hydrolyze said mixed alkoxides and to form a silica-titania precipitate.

20. The process of claim 19 wherein said silica-titania composition has a surface area ranging from about 100 to about 400 m$^2$/g and a bulk density ranging from about 0.2 to about 0.6 g/cc.

21. The process of claim 19 wherein said silica-titania composition has a surface area ranging from about 200 to about 400 m$^2$/g and a bulk density ranging from about 0.3 to about 0.6 g/cc.

22. The process of claim 19 wherein said silica-titania composition comprises from about 53 to about 91 weight percent titania.

23. The process of claim 19 wherein said organic diluent comprises an alcohol.

24. The process of claim 19 wherein said organic solvent in said hydrolysis mixture is an alcohol.

25. The process of claim 19 wherein the molar ratio of silicon alkoxide to titanium alkoxide in step (a) ranges from about 0.05:1 to 10:1.

26. The process of claim 19 wherein the molar ratio of siliconalkoxide to titanium alkoxide in step (a) is about 1:1.

27. The process of claim 19 wherein the hydrolysis of step (b) is conducted at a temperature ranging from about 25° to about 100° C.

28. The process of claim 19 wherein said mixed alkoxides mixture is added to said hydrolysis mixture at a rate of about 2 to about 6 cc/minute.

29. The process of claim 19 wherein said alkoxide constituent of said silicon alkoxide and of said titanium alkoxide is selected from the group consisting of $C_1$ to $C_{20}$ alkoxides.

30. The process of claim 19 wherein said alcohol diluent used in step (a) is selected from the group consisting of $C_1$ to $C_4$ alcohols.

31. The process of claim 19 wherein said alcohol solvent used in said hydrolysis mixture is selected from the group consisting of $C_1$ to $C_4$ alcohols.

32. The process of claim 19 wherein said water is present in said hydrolysis mixture in an amount sufficient to hydrolyze theoretically completely said alkoxides.

33. The process of claim 19 wherein said organic solvent is present in said hydrolysis mixture in an amount ranging from about 50 to about 95 volume percent based on the total hydrolysis mixture.

34. The process of claim 19 wherein said silica-titania precipitate is separated from said hydrolysis mixture and wherein said separated precipitate is calcined.

35. The process of claim 34 wherein said calcination is conducted at a temperature ranging from about 400° to about 800° C.

36. The process of claim 34 wherein prior to said calcination step, said precipitate is air dried.

37. The process of claim 19 wherein said metal or compound of said metal composited with said silica-titania is selected from the group consisting of metals or compounds of copper, iron, chromium, vanadium, and the group VIII noble metals.

* * * * *